United States Patent
Kia et al.

(10) Patent No.: US 9,071,819 B2
(45) Date of Patent: Jun. 30, 2015

(54) SYSTEM AND METHOD FOR PROVIDING TEMPORAL-SPATIAL REGISTRATION OF IMAGES

(75) Inventors: Omid E. Kia, North Bethesda, MD (US); Justin M. Graybill, Fairfax, VA (US)

(73) Assignee: Exelis Inc., McLean, VA (US)

( * ) Notice: Subject to any disclaimer, the term of this patent is extended or adjusted under 35 U.S.C. 154(b) by 684 days.

(21) Appl. No.: 13/233,635

(22) Filed: Sep. 15, 2011

(65) Prior Publication Data

US 2013/0070961 A1 Mar. 21, 2013

(51) Int. Cl.
- *G06K 9/32* (2006.01)
- *G06K 9/36* (2006.01)
- *H04N 17/00* (2006.01)
- *G06T 7/00* (2006.01)
- *H04N 5/247* (2006.01)

(52) U.S. Cl.
CPC ............ *H04N 17/002* (2013.01); *G06T 7/0028* (2013.01); *G06T 7/0038* (2013.01); *H04N 5/247* (2013.01); *G06T 2207/10016* (2013.01); *G06T 2207/10032* (2013.01); *G06T 2207/10048* (2013.01)

(58) Field of Classification Search
CPC ...... G06T 7/003; G06T 7/0034; G06T 7/0032
See application file for complete search history.

(56) References Cited

U.S. PATENT DOCUMENTS

| | | | |
|---|---|---|---|
| 6,907,570 B2 * | 6/2005 | Amir et al. | 715/720 |
| 7,542,073 B2 * | 6/2009 | Li et al. | 348/218.1 |
| 8,289,392 B2 * | 10/2012 | Senior et al. | 348/154 |
| 8,559,757 B1 * | 10/2013 | Kia et al. | 382/294 |
| 2006/0061653 A1 * | 3/2006 | Hampapur et al. | 348/143 |
| 2008/0259179 A1 * | 10/2008 | Senior et al. | 348/222.1 |

OTHER PUBLICATIONS

Bright et al, Shape-based topologies for real-time onboard image generation, Proc. SPIE 8360, Airborne Intelligence, Surveillance, Reconnaissance (ISR) Systems and Applications IX, 83600C (May 1, 2012).*

Holtkamp et al, Precision Registration and Mosaicking of Multi-camera Images, IEEE Transactions on Geoscience and Remote Sensing, vol. , No. , Year 2009.*

(Continued)

*Primary Examiner* — Andrae S Allison
(74) *Attorney, Agent, or Firm* — Davidson Berquist Jackson & Gowdey LLP

(57) ABSTRACT

A video imaging system for use with or in a mobile video capturing system (e.g., an airplane or UAV). A multi-camera rig containing a number of cameras (e.g., 4) receives a series of mini-frames (e.g., from respective field steerable mirrors (FSMs)). The mini-frames received by the cameras are supplied to (1) an image registration system that calibrates the system by registering relationships corresponding to the cameras and/or (2) an image processor that processes the mini-frames in real-time to produce a video signal. The cameras can be infra-red (IR) cameras or other electro-optical cameras. By creating a rigid model of the relationships between the mini-frames of the plural cameras, real-time video stitching can be accelerated by reusing the movement relationship of a first mini-frame of a first camera on corresponding mini-frames of the other cameras in the system.

24 Claims, 12 Drawing Sheets

(56) References Cited

OTHER PUBLICATIONS

Ramachandran, M.; Chellappa, R., "Stabilization and Mosaicing of Airborne Videos," Image Processing, 2006 IEEE International Conference on , vol., No., pp. 345,348, Oct. 8-11, 2006.*

Reynolds, W.D.; Campbell, D.S., "A Scalable Video Stabilization Algorithm for Multi-camera Systems," Advanced Video and Signal Based Surveillance, 2009. AVSS '09. Sixth IEEE International Conference on , vol., No., pp. 250,255, Sep. 2-4, 2009.*

* cited by examiner

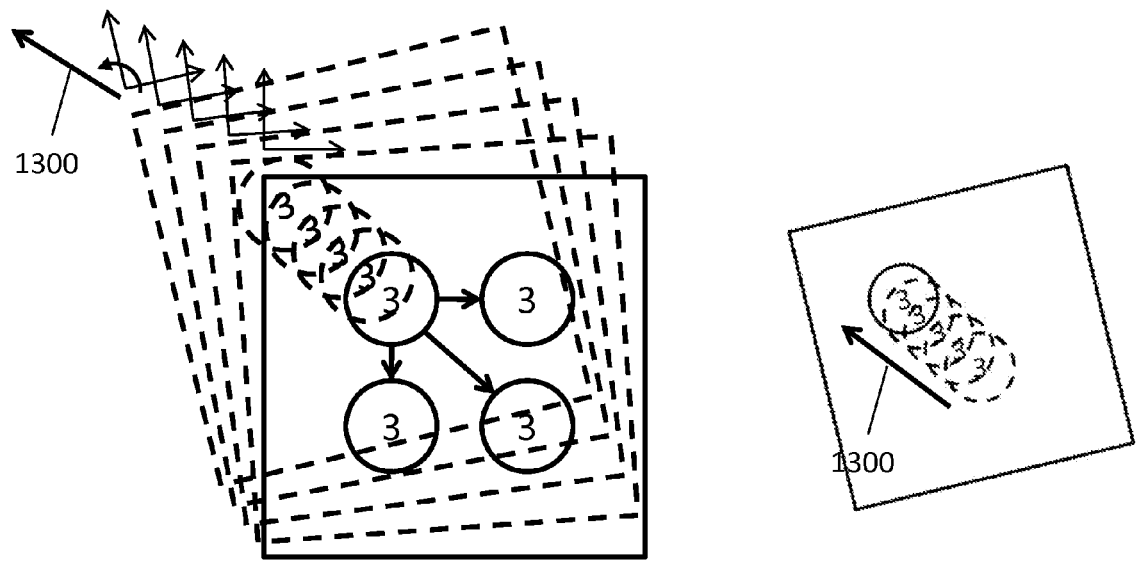
Figure 15A
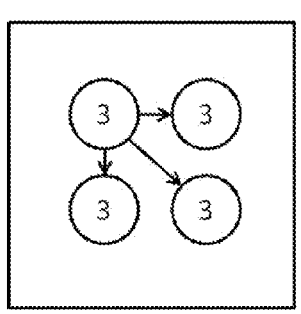
Figure 15B
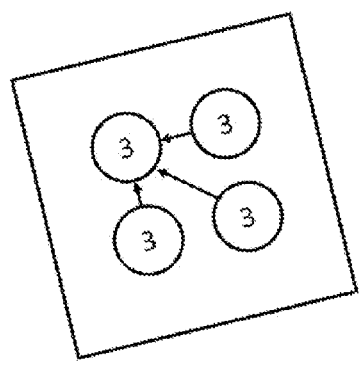
Figure 15C
Figure 15D

SYSTEM AND METHOD FOR PROVIDING TEMPORAL-SPATIAL REGISTRATION OF IMAGES

CROSS REFERENCE TO RELATED APPLICATIONS

The present invention is related to U.S. patent application Ser. No. 12/729,591, filed on Mar. 23, 2010, entitled "PHOTOGRAMMETRIC METHOD AND SYSTEM FOR STITCHING AND STABILIZING CAMERA IMAGES."

FIELD OF INVENTION

The present invention is directed to a system and method for registering plural images taken with plural sensors, and in one embodiment to a system and method for providing temporal-spatial registration of images to calculate image dependencies and provide real-time video processing utilizing the calculated image dependencies.

DISCUSSION OF THE BACKGROUND

Remote imaging systems are in use in many applications ranging from convenience store monitoring cameras to sophisticated imaging systems on satellites in space. Such systems typically include an imaging sensor comprised of light-gathering optics, a detector array and support electronics that produce an electronic video signal transmitted to a remote site for human operator viewing and recording.

The imaging sensor is often rotated about one or more axes (usually using a set of gimbals) or translated in space to view an area that is larger than that covered by the sensor's field of view. Often, the sensor's optical system contains a zoom lens or switchable elements that allow the field of view to be changed for greater resolution, or for a larger field of view. In most applications, the images received from the remote sensor are recorded for later viewing and/or processing by observers at remote sites.

Image registration may be defined as a process of spatially aligning two or more images of a scene. This basic operation is often used for remote sensing applications that involve two or more images of a region of interest. Typically the quality of the registration is limited by the available processing power. Image mosaicking may be defined as a process of smoothly piecing together overlapping images of a scene into a larger image. This operation is used to increase the area of coverage of an image without sacrificing its resolution. An image mosaic is created from a set of overlapping images by registering and resampling all images to the coordinate space of one of the images.

When multiple cameras are positioned close to each other in a camera housing, the distance to the scene, or the region of interest, may be assumed to be the same. The distance and elevation angle to the scene, however, may likely change from one set of images to the next set of images. If this change is not negligible, overlapping images may have geometrical differences, which need to be considered.

Typically, a transformation model representing local geometric differences between overlapping images are used to register the images. The transformation model considers geometrical differences in the overlapping regions between each camera in the housing, and geometrical differences occurring in each camera due to temporal changes in the distance and elevation angles to the scene. Thus, achieving precision registration among multiple cameras is a difficult problem.

The transformation model is typically aided by a host of sensors found in an aircraft, or in an unmanned airborne vehicle (UAV). The sensors may include an inertial measuring unit (IMU) with gyros and accelerometers. These sensors provide independent information about the motion of the cameras disposed in the camera housing (or rig). The information, or metadata, includes the intrinsic parameters of each camera. It also provides the orientation of each camera with respect to a World Coordinate System (WCS) for each frame in a sequence of frames.

Image registration may also be enhanced by various features known to be found within the scene, or region of interest. Such features may include known landmarks. Thus, feature based registration first processes image intensities to identify unique landmarks, or control points in the images. These control points are then used to register the sequence of images.

As these control points move from one image to the next image, the motion may be quantified and used in the temporal characterization of the sequence of images. This motion, as seen by the sequence of images, is known as optical flow. As used herein, optical flow is a two-dimensional velocity field in the image plane induced by relative motion of an imaging sensor (camera) and/or an object(s) in the field-of-view (FOV).

Optical flow, at the pixel level, generally assumes a constancy in the spatial and temporal variations of the image brightness in the FOV. While this may be a valid assumption with an array of electro-optical (EO) cameras housed in an aircraft rig, it generally is not valid with an array of infrared (IR) cameras housed in a similar aircraft rig.

BRIEF DESCRIPTION OF THE DRAWINGS

The following description, given with respect to the attached drawings, may be better understood with reference to the non-limiting examples of the drawings, wherein:

FIG. 15A is an illustration of a partial frame and the location of position 3 of the cameras during an initial frame and the corresponding location of the same portion of the frame in subsequent frames;

FIG. 15B is an illustration of the initial frame of FIG. 15A;

FIG. 15C is an illustration of a final frame of FIG. 15A after a series of movements;

FIG. 15D is an illustration of the determination of a movement relationship corresponding to the movement of FIG. 15A.

DISCUSSION OF THE PREFERRED EMBODIMENTS

Figure 1:
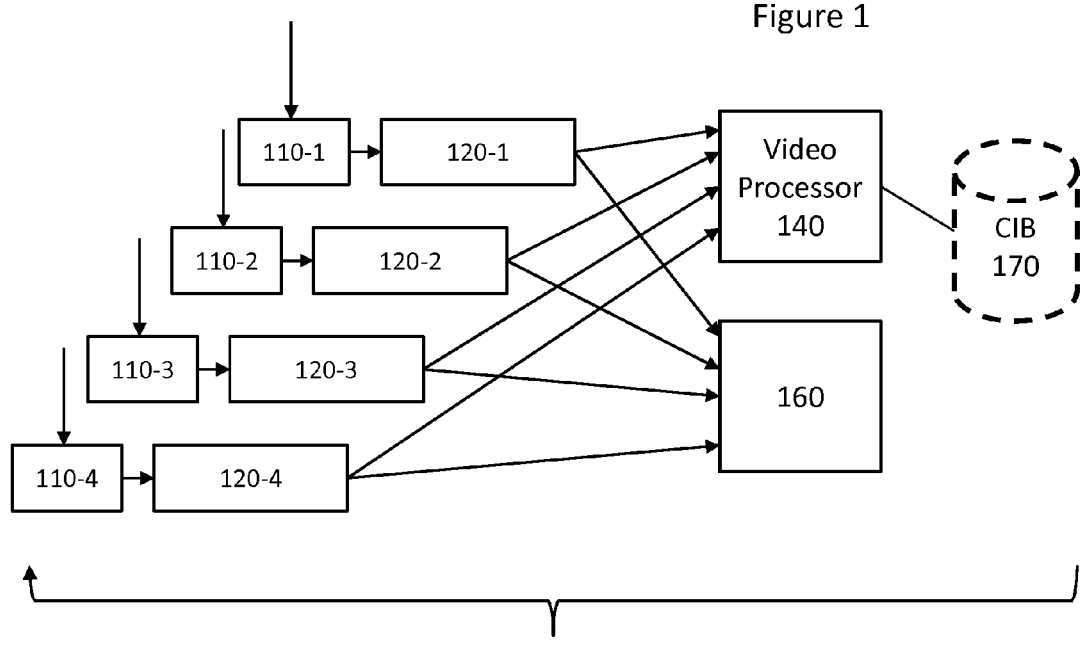
FIG. 1 is a block diagram of an exemplary multi-camera video imaging system in which multiple field steerable mirrors project images onto respective cameras for processing by a video processor and/or a video registration system.

Turning to FIG. 1, FIG. 1 illustrates a video imaging system 100 as may be used with or in a mobile video capturing system (e.g., an airplane or UAV). In the exemplary system, four cameras (120-1 to 120-4) receive a series of mini-frames from respective field steerable mirrors (FSMs) (110-1 to 110-4). The mini-frames received by the cameras are supplied to at least one of (1) an image registration system 160 that calibrates the system by registering relationships corresponding to the cameras (120-1 to 120-4) and (2) an image processor 140 that processes the mini-frames, as described in greater detail below. In one embodiment, the cameras (120-1 to 120-4) are infra-red (IR) cameras; however, cameras (e.g., EO cameras, LIDAR/LADAR cameras) capturing different parts of the light spectrum or time of flight are also possible.

Figure 2:
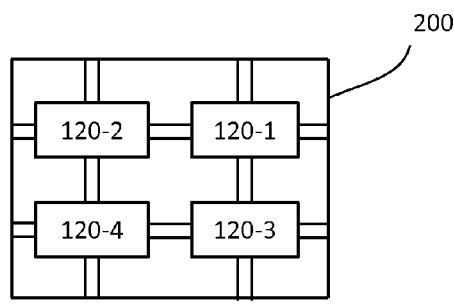
FIG. 2 is a block diagram of a cameras of the multi-camera video imaging system of FIG. 1 being held in a mounting rig.

As shown in FIG. 2, the cameras (120-1 to 120-4) preferably are mounted within a mounting rig 200 such that the positional relationship between the cameras (120-1 to 120-4) is fixed over the time that the system is used after a multi-camera registration process, such as is described below. However, the system can be dismantled and re-assembled if the system is again run through a multi-camera registration process.

Figure 3:
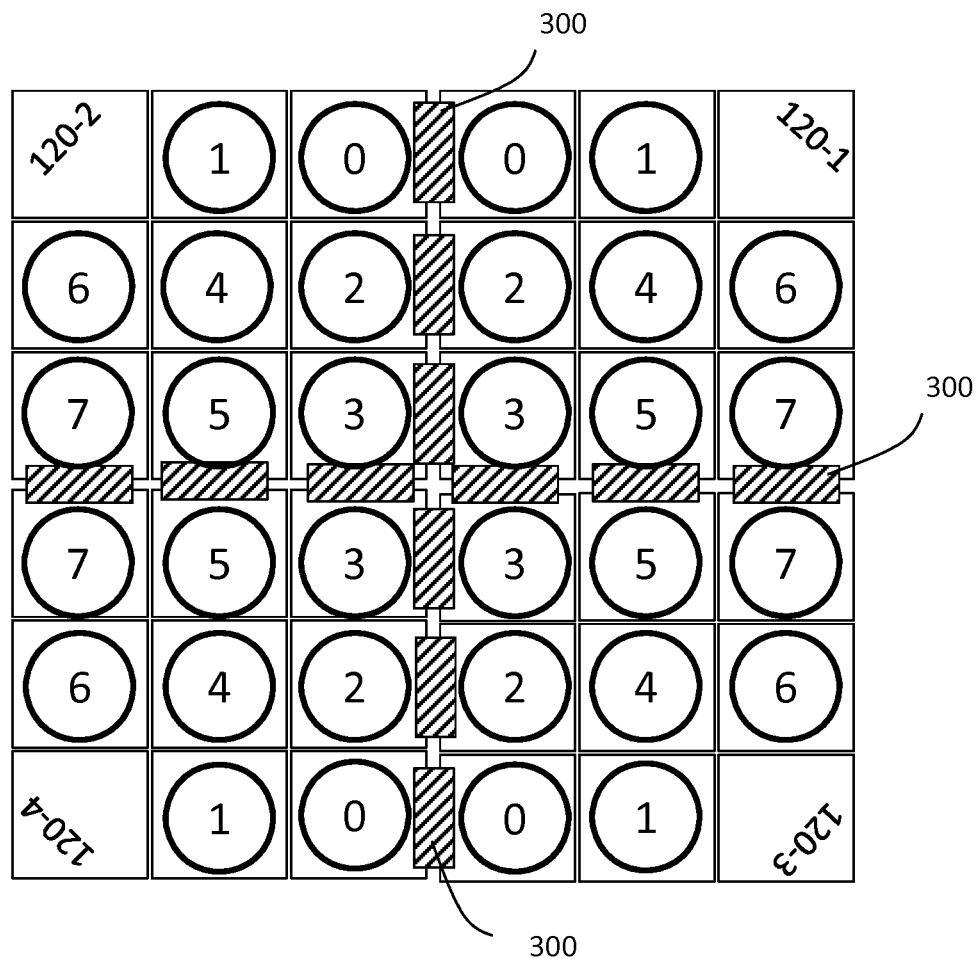
FIG. 3 is a block diagram of a series of mini-frames from the multi-camera video imaging system of FIG. 1 being stitched together to form a frame.

By utilizing the Field Steerable Mirrors (110-1 to 110-4), the cameras (120-1 to 120-4) can be used to focus on a number of different areas within the line of sight of a mobile system. For example, as shown in FIG. 3, the cameras (120-1 to 120-4) and their Field Steerable Mirrors (110-1 to 110-4) can be utilized to sequentially capture a series of 8 synchronized mini-frames each, thereby creating a set of 32 mini-frames per frame. Each of the mini-frames designated with the same number is taken at the same time by using the respective FSMs (turned to corresponding rotation position) and a highly accurate actuator for the cameras. (The illustrated pattern of mini-frames 0 to 7 is referred to a Zig-2 pattern.) By utilizing image processing techniques, the frame is created by stitching together the individual mini-frames in the set of mini-frames.

However, in order to create a consistent set of mini-frames that can be accurately and quickly stitched together (e.g., when in a real-time mode as described below), it is preferable to create a "rigid model" which describes the relative positions (or registrations) with respect to each of the cameras and their mini-frames. By doing so, the system can more easily register the mini-frames of one frame with another frame by determining the relative registration of one camera's mini-frames in a first frame with that camera's mini-frames in a second super-frame and then applying the same relative registration to the remaining cameras in the system.

In order to determine the rigid model representing the relationship between cameras, the individual mini-frames of the multiple cameras are registered between themselves, where possible. The mini-frames designated by the numeral 3 have the most partial overlaps 300 between cameras and mini-frames, and it is possible to start by registering those mini-frames first. However, the size of the overlaps 300 may be too small to accurately align the mini-frames relative to each other. (In fact, the registrations process described herein works even if there is no overlap between the mini-frames of some portions of the frame.) To address the overlaps that are too small, it is possible to first extend the mini-frames by stitching together not mini-frames in space but rather mini-frames in time. This process takes advantage of "temporal coherence" between mini-frames during a registration process.

Figure 4:
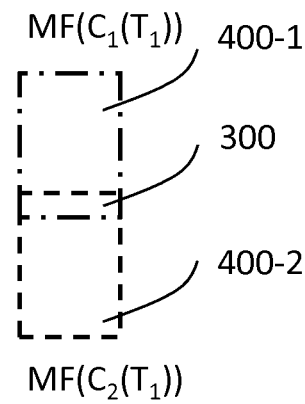
FIG. 4 is block diagram of an exemplary two-camera (100-1/100-2) configuration where the mini-frames of the first camera ($MF(C_1)$) and the mini-frames of the second camera ($MF(C_2)$) have a small amount of overlap in the vertical direction.
Figure 5:
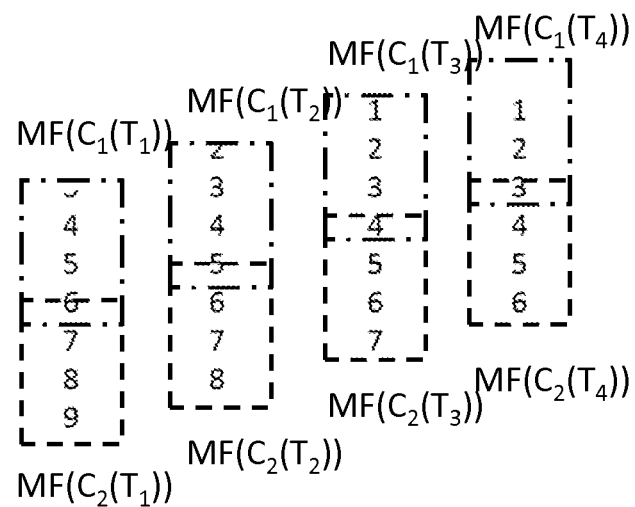
FIG. 5 is a block diagram of images of the two-camera configuration of FIG. 4 at a series of times $T_{1-4}$.

As shown in FIG. 4, a set of mini-frames $MF(C_1(T_1))$ (designated as 400-1) and $MF(C_2(T_1))$ (designated as 400-2) were taken at the same time ($T_1$), and the set of mini-frames has a small amount of overlap 300. By taking additional mini-frames closely in time with the first mini-frames, as shown in FIG. 5, the system can store a series of mini-frames (designated $MF(C_x(T_y))$ (for x=1 or 2 and y=2, 3 and 4), and each set in the series has the same registration between the cameras and therefore the same amount of overlap. As the mobile video capturing system moves during the registration process, each of the overlaps 300 at times $T_2$, $T_3$ and $T_4$ will have the same amount of data as occurred at time $T_1$. However, by registering $MF(C_x(T_2))$, $MF(C_x(T_3))$ and $MF(C_x(T_4))$ with each other and with $MF(C_x(T_1))$, the system can produce an extended mini-frame which has more overlap between cameras than any one set of mini-frames at any one time.

Figure 6:
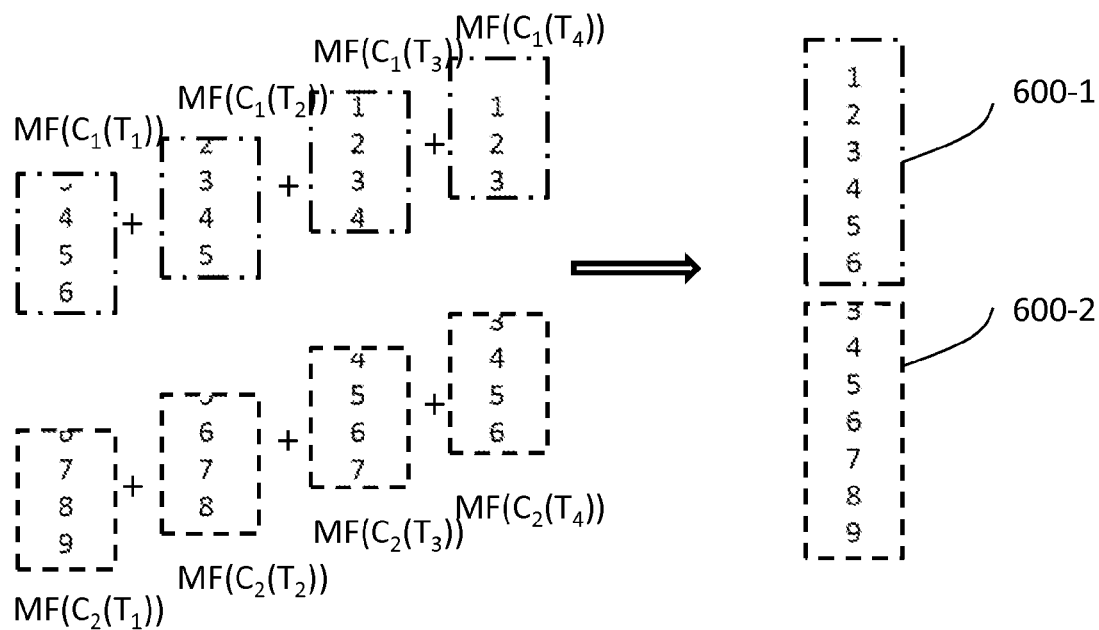
FIG. 6 is an illustration of the process of combining series of mini-frames from two respective cameras into corresponding extended mini-frames.
Figure 7:
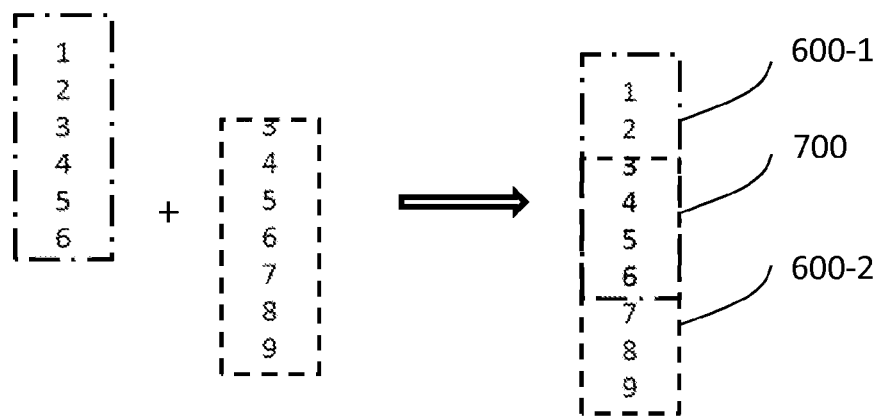
FIG. 7 is an illustration of the process of registering extended mini-frames from two cameras with each other.

As shown in FIG. 6, a set of mini-frames from each camera are combined together to form an extended mini-frame over the time period of the extended mini-frame. For example, mini-frames $MF(C_1(T_1))$-$MF(C_1(T_4))$ taken over the time period of $T_1$-$T_4$ are combined to form extended mini-frame 600-1. Similarly, mini-frames $MF(C_2(T_1))$-$MF(C_2(T_4))$ also taken over the time period of $T_1$-$T_4$ are combined to form extended mini-frame 600-2. As shown in FIG. 7, the extended mini-frames 600-1 and 600-2 can be utilized to determine a registration between the extended mini-frames. For example, it may be determined that the position of $MF(C_1)$ compared to $MF(C_2)$ needs to be adjusted by m pixels in the x-direction and n pixels in the y-direction in order to align the mini-frames from the different cameras. It may further be determined that there is a relative rotation between the cameras such that the images need to be rotated by a particular amount in order to be registered.

While the process of creating extended mini-frames is shown in FIGS. 4-7 as utilizing sequential mini-frames taken during motion in a single direction, it is also possible to utilize sequential mini-frames taken with motion in plural directions and/or during a rotation of the mobile video capturing system. Similarly, the number of mini-frames that are combined in order to form an extended mini-frame can be less than or more than the four mini-frames shown.

Figure 8:
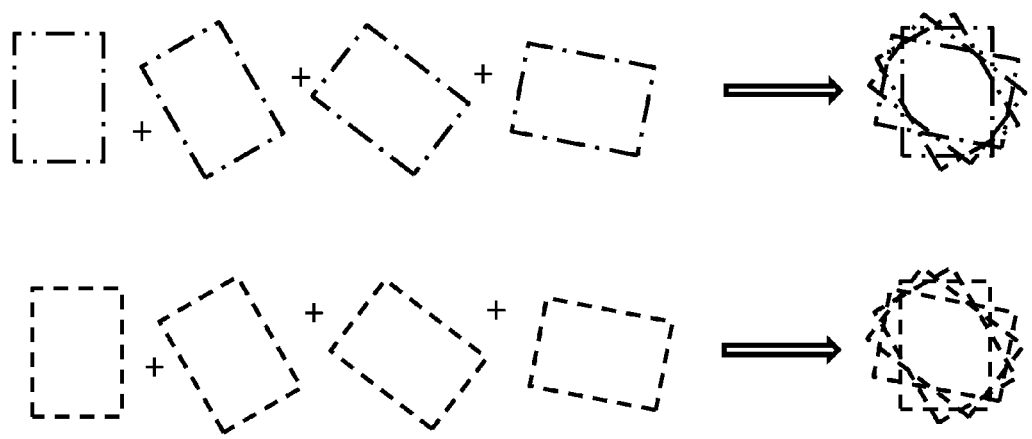
FIG. 8 is an illustration of the process of combining series of rotated mini-frames from two respective cameras into corresponding extended mini-frames.

By utilizing motion in plural directions and/or during a rotation of the mobile video capturing system, extended mini-frames with larger overlaps between the cameras in each direction can be created, thereby easing registration between all the cameras of a mounting rig 200. As shown in FIG. 8, a set of mini-frames are taken while the mobile video capturing system is rotating such that the resulting extended mini-frames have additional overlap with each of their adjacent extended mini-frames as compared with any set of two adjacent mini-frames.

Having determined the registration of a first set of extended mini-frames to each other, the remaining extended mini-frames for the same position can be registered as well. Assuming that the extended mini-frames taken at position 3 of FIG. 3 are used to register cameras 120-1 and 120-2, the same process can then be used to register the extended mini-frames taken at position 3 of FIG. 3 for cameras 120-1 and 120-3. Likewise, the same process can then be used to register the extended mini-frames taken at position 3 of FIG. 3 for cameras 120-2 and 120-4. The relative registrations can then be used to register cameras 120-1 and 120-4 such that the system can know the relative positions (and potentially rotations) of all cameras with respect to each other. This registration is stored by the system (e.g., in a non-volatile memory) to enable its use later when combining parts of a frame.

Figure 9:
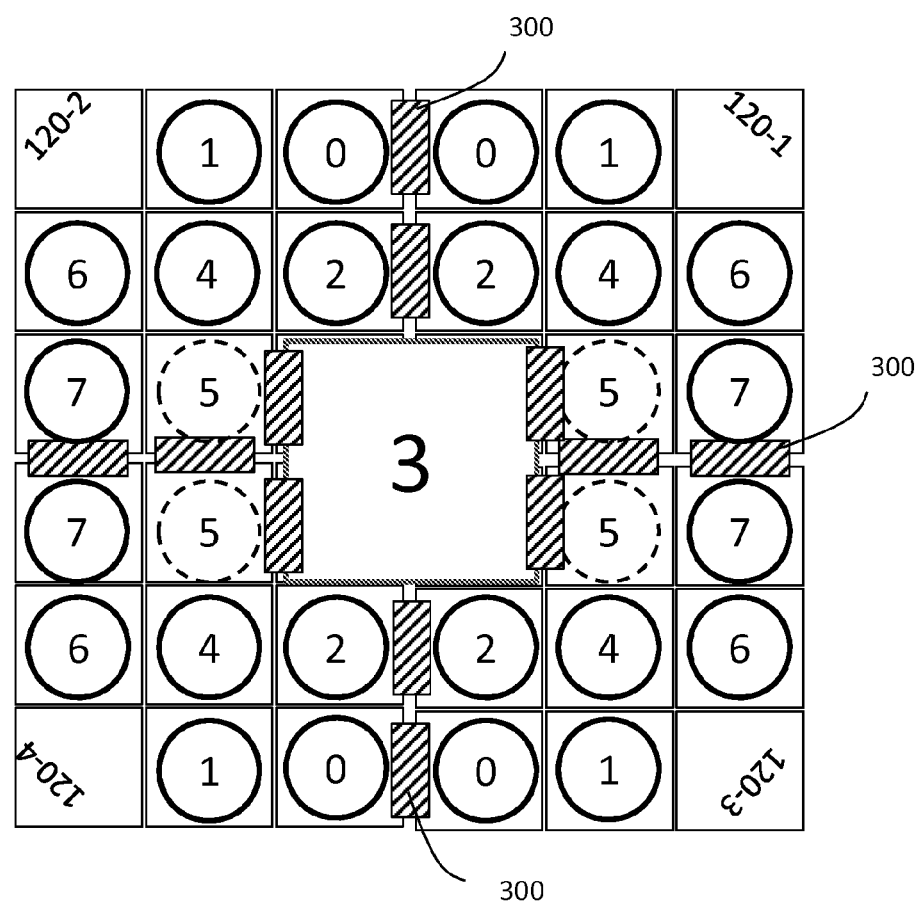
FIG. 9 is an illustration of the cameras of the video imaging system having been registered with respect to a first portion of a frame and being prepared to register with respect to an exemplary second portion.
Figure 10:
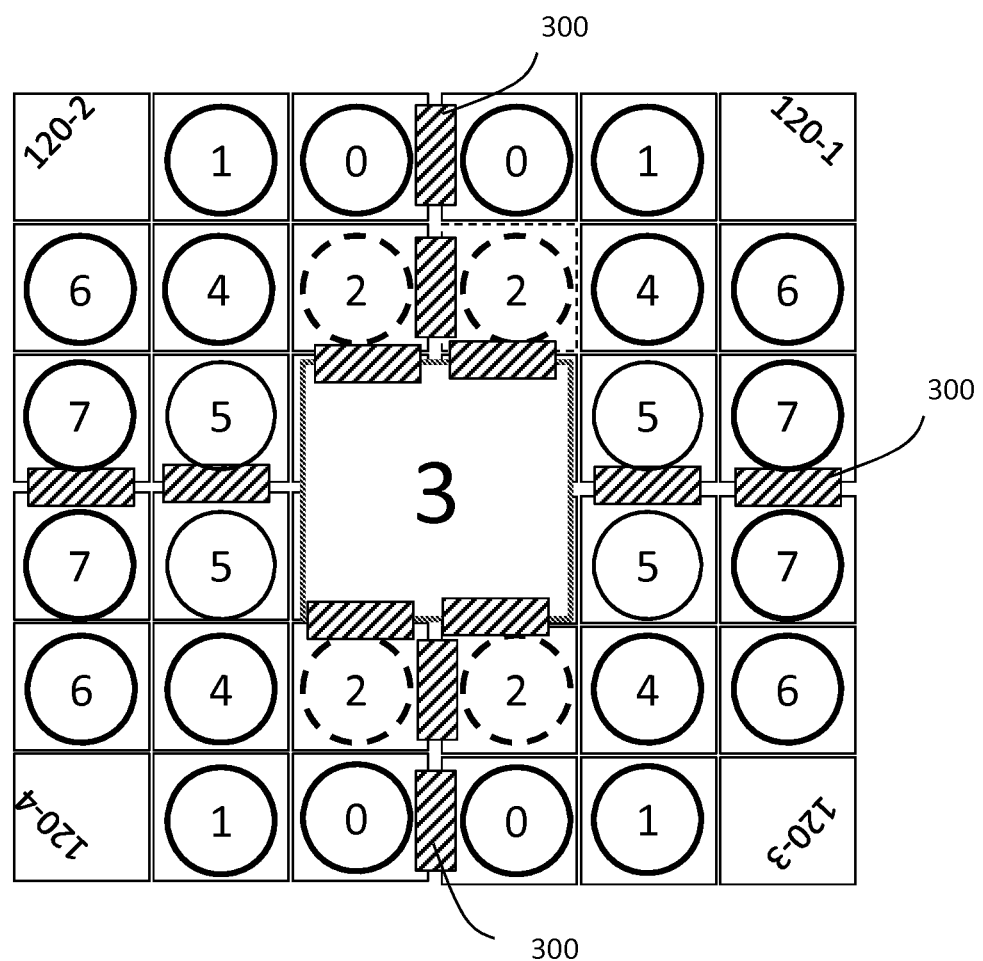
FIG. 10 is an illustration of the cameras of the video imaging system having been registered with respect to a first portion of a frame and being prepared to register with respect to a different exemplary second portion.

The relative registrations of the other mini-frames for the other positions can then be built off of the combined mini-frames resulting from combining the mini-frames at position 3 using their relative registrations. For example, the mini-frames of position 5 as shown in FIG. 9 have overlap between cameras 120-2 and 120-4 and between cameras 120-1 and 120-3. Thus, the extended mini-frames from cameras 120-2 and 120-4 can be registered with each other and then with the combined mini-frames at position 3 or they can be each registered with a corresponding portion of the combined mini-frames from position 3. Alternatively, as shown in FIG. 10, the extended mini-frames of position 2 could have been used to register to the combined mini-frames from position 3 before registering the extended mini-frames from position 5.

Figure 11:
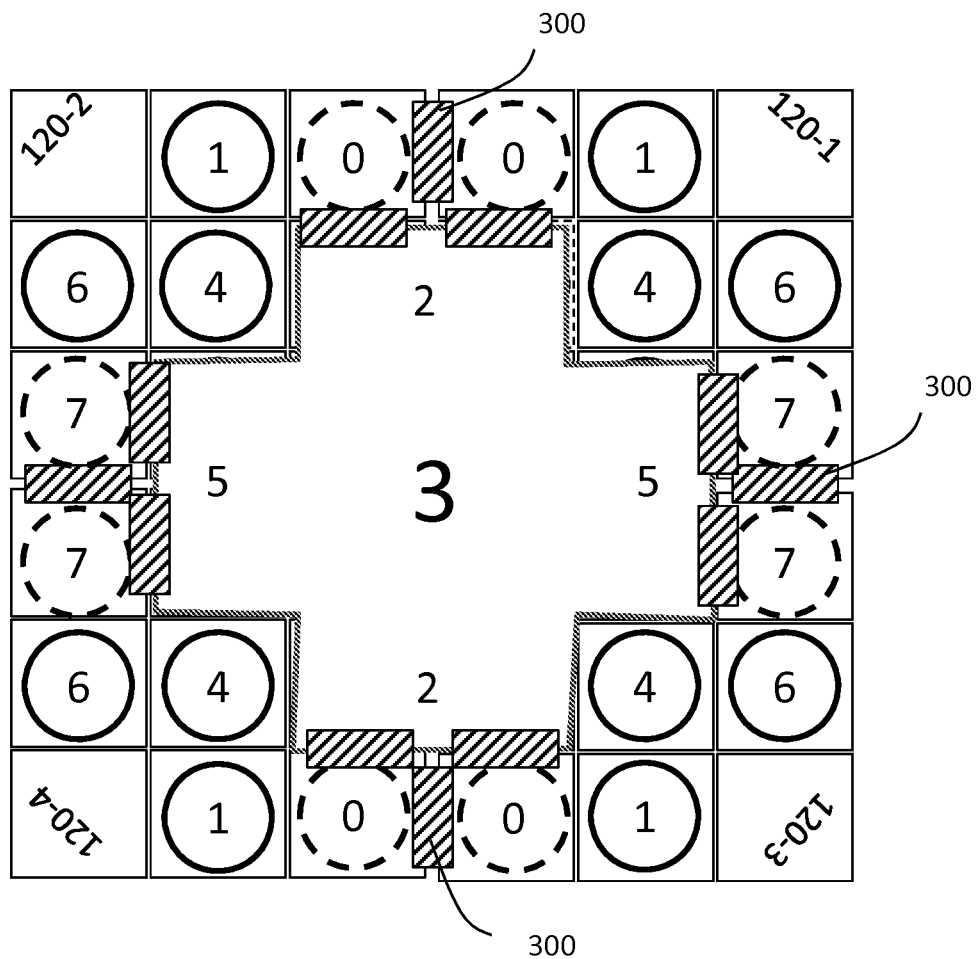
FIG. 11 is an illustration of the cameras of the video imaging system having been registered with respect to second portions of a frame.

A similar registration process can then be performed for registering the extended mini-frames from position 7 to each other and to the larger combined mini-frames (shown as a cross in FIG. 11) and for registering the extended mini-frames from position 0 to each other and to the larger combined mini-frames.

Figure 12:
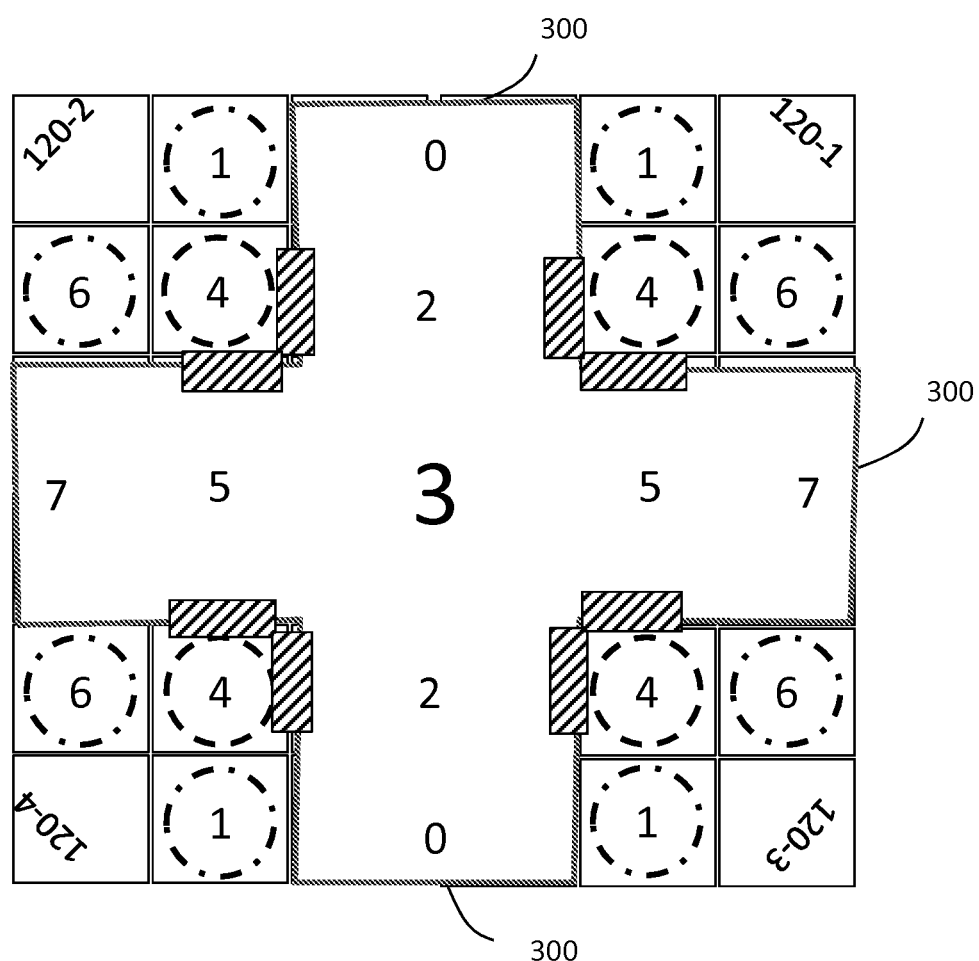
FIG. 12 is an illustration of the cameras of the video imaging system having been registered with respect to third portions of a frame.

As shown in FIG. 12, the only remaining mini-frames of the frame that need to be combined with the combined parts are the portions corresponding to the mini-frames at positions 4, 6 and 1. By combining the extended mini-frames from position 4 first, the system can use the overlap with extended mini-frames from positions 2 and 5 for more accurate registration. The system can then register the extended mini-frames from position 6 with the combined mini-frames at the points from extended mini-frames from positions 7 and 4, and the system can then register the extended mini-frames from position 1 with the combined mini-frames at the points from extended mini-frames from positions 4 and 0.

When generating extended mini-frames from mini-frames in a frame, the process need not be performed in real-time. A video registration system 160 contained within the mobile system or in an off-line support system can retrieve mini-frames corresponding to a frame from a database of mini-frames using their corresponding metadata (e.g., timestamp information or GPS/INU information) to retrieve overlapping mini-frames that are registered to make up an extended mini-frame. The extended mini-frames are then used to calculate the registration between the cameras and the registration between the mini-frames as described above.

Once the registration process has been completed, the system can be used to calculate the relationship between each mini-frame position for each camera with every other mini-frame position for every other camera. These relationships can be used later when the system is capturing motion video to enable the system to speed up image stitching in real-time. For example, if during motion capture the system captures all 32 mini-frames in a frame at a rate of 2 Hz, and if the mobile video capturing system is flying in a generally repeated pattern (e.g., a circle or oval) around a target area, then there is significant overlap between portions of two successive frames.

Figure 13:
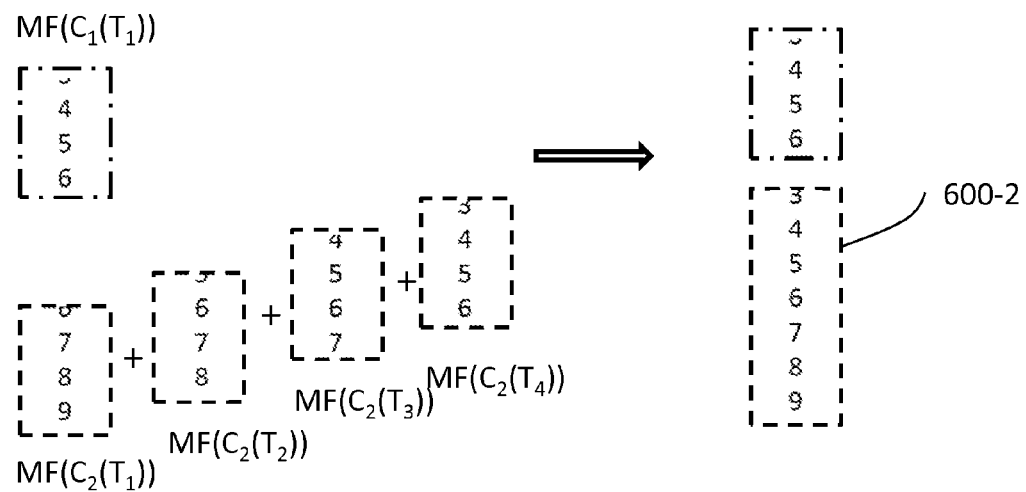
FIG. 13 is an illustration of the process of combining series of mini-frames from a first cameras into an extended mini-frame for registration with a mini-frame from a second camera.
Figure 14:
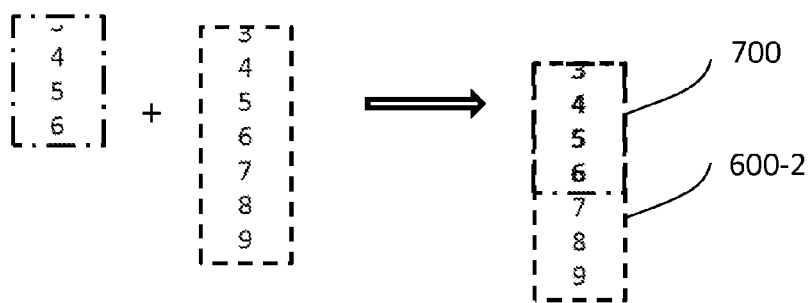
FIG. 14 is an illustration of the process of registering an extended mini-frame from a first camera with a mini-frame from a second camera.

While the above discussion has been made with respect to extending all of the mini-frames into corresponding extended mini-frames, it is possible to extend a subset of the mini-frames as long as the extended mini-frames have a sufficient overlap with the non-extended mini-frames to allow for improved image overlap as compared with techniques that do not use any extended mini-frames. For example, as shown in FIG. 13, depending on the movement of the camera rig during the mini-frame extension process, the mini-frame corresponding to position 3 for camera 2 (i.e., $MF(C_2)$) could be extended (in one or two dimensions) such that increased overlap occurs between the mini-frame corresponding to position 3 for camera 2 and the mini-frame corresponding to position 3 for camera 1 without having to form an extended mini-frame corresponding to position 3 for camera 1. Instead, as shown in FIG. 14, there can be sufficient overlap between the extended mini-frame and an adjacent, non-extended mini-frame.

Similarly, if extended mini-frames are made for plural cameras, the number of mini-frames that are stitched together to form the extended mini-frames need not be the same. For example, instead of a single mini-frame from camera 1 being registered with an extended mini-frame for camera 2 (shown in FIG. 13), two or more mini-frames for camera 1 could be stitched together to form an extended mini-frame for camera 2 that is bigger or smaller than the extended mini-frame for camera 2.

In addition, depending on the movement of the camera rig during the mini-frame extension process, extended mini-frames need not be created for all of the rotation positions. For example, the mini-frame corresponding to position 3 could be extended (in one or two dimensions) such that increased overlap occurs between the mini-frame corresponding to position 3 and the mini-frames corresponding to positions 2, 4 and 5. Thus, the mini-frames corresponding to positions 2, 4 and 5 would not have to be extended. Later, by using extended mini-frames corresponding to positions 0, 1, 6 and 7, those extended mini-frames could be registered with the mini-frame corresponding to position 2, 4 and 5, even if the mini-frame corresponding to position 2, 4 and 5 were not extended.

It is also possible to utilize the technique of extending mini-frames without the use of field steerable mirrors. In an embodiment that utilizes a moveable rig, the entire rig may be moved (e.g., panned), and the registration process described herein to determine the registration between cameras in the rig would still be applicable.

In yet another embodiment, a series of cameras may be mounted to a frame that includes at least one synchronized control motor for each camera such that the cameras move within the frame without requiring movement of the frame. In such a configuration, the changes in angle of the cameras as they move within the frame may result in a change in registration between the cameras. In order to address this registration change, the system may, in advance as is described above for a single rigid model, determine multiple rigid models for the frame where registrations are tracked on an angle-by-angle basis. Thus, the system would apply an angle-specific registration to the images, depending on the angle of the cameras within the frame.

In yet another embodiment, the camera within a rig or frame need not all have the same magnification and/or zoom. In one embodiment, a first camera (with greater relative zoom) is utilized for higher resolution imagery (e.g., in a center of a field of view) and at least one second camera (e.g., several cameras surrounding the first camera in a frame or rig) is utilized for lower resolution imagery. Using the technique described above with respect to fixed magnification cameras, registration can be performed between cameras of different magnifications. (The resolution of the higher resolution camera(s) may need to be down-sampled to match or be similar to the resolution of the lower resolution camera(s) prior to registering the images.) Furthermore, in an embodiment where the magnification of at least one camera is variable, the registration process can be performed multiple times to create registration information corresponding to how the images from multiple cameras should be registered, depending on the magnifications set in the camera(s) at the time the images were captured.

If the system determines the movement relationship between two successive frames, then the system can stitch together the mini-frames of successive frames to produce smoother video. However, the calculations to determine the movement relationship are computationally complex, and performing that calculation for each mini-frames is additionally time consuming. Accordingly, the system can achieve a significant increase in processing capability if the system can determine the movement relationship for any one of the mini-frames at a particular mini-frame position and then use the movement relationship and the known registrations between mini-frames to calculate the relative movements of the remaining mini-frames at the same mini-frame position in the frame. For example, as shown in FIG. 15A, a camera rig undergoes a series of movements (with translation and rotation) while capturing a series of frames. (The original position of the camera rig in the series of movements is shown by itself in FIG. 15B, and the final position of the camera rig in the series of movements is shown by itself in FIG. 15C.) In FIG. 15A, the location of the portion of the frame captured at position 3 in a first frame for each of the cameras is shown in solid lines, and, based on the movements (including rotation) of the platform prior to capturing subsequent frames, the corresponding portions of location 3 of the previously captured first frame are shown in dashed lines as the subsequent frames are captured. The change in locations of that portion of the first frame as compared to the subsequent frames is represented by the movement relationship 1300. For simplicity purposes, only the motion of the images corresponding to position 3 are shown.

After each frame is captured, the movement relationship 1300 of the mini-frame at position 3 for a first camera (120-1) can be determined, as shown in FIG. 15D, and the same movement relationship can be used for the remaining mini-frames at position 3 for the remaining cameras (120-2 to 120-4). In fact, generally, once the movement relationship is calculated for a mini-frame at position n (where n=0.7 in the example) for a first camera (120-1), the same movement relationship can be used for the remaining mini-frames at position n for the remaining cameras (120-2 to 120-4).

This reduction in computational complexity of the image processing may enable the computations to be performed on the mobile platform rather than by specialized receiving hardware that would receive the separate frames and then stitch them together remotely from the mobile platform. As such, the costs of the receiving hardware could be reduced, especially when taken in the aggregate since there may be multiple sets of receiving hardware for any one mobile platform.

The system may also include an image processor 140 that includes a control image base (CIB) 170. The CIB includes known features (e.g., landmarks or other characteristics) that are loaded into the memory or storage system of the image processor 140. The mini-frames can be registered with stored features at every mini-frame position to accelerate or improve registration between frames. The system may utilize a stored CIB and a separate buffered or cached CIB. The stored CIB receives images from storage before departure of the mobile system (e.g., before aircraft takeoff). The CIB also includes stored features and stored geographic locations.

The CIB is used to register the images received from the infrared cameras with the stored features and geographic locations found in the databases. The system may additionally add an inline-CIB which may improve upon the stored CIB. As a frame is received by the system, various feature points may be extracted from the frame. These features may be matched to feature points already stored in CIB. As new feature points are obtained, the inline-CIB may become more accurate than the initially stored CIB. By considering frames received from the IR cameras, the inline-CIB may obtain better features than features initially stored in the CIB, because the latter typically includes features that are obtained from images taken by an EO camera.

The system can use one or a combination of pixel-based registration and/or feature-based registration. Pixel-based registration may include block matching (blocks are matched using sum-and-difference); optical flow (spatiotemporal derivatives are used to determine motion); and/or cross-correlation (a block intensity compared against a normalized cross-correlation (NCC) is scored against other blocks). Feature-based registration may include a set of algorithms working together; scale invariant feature transformation (SIFT) (assigns key points around blobs in image); Harris detection (detects corner features); and/or wavelet processing (corners, edges, points, features, etc. are detected from wavelet coefficients).

Figure 16:
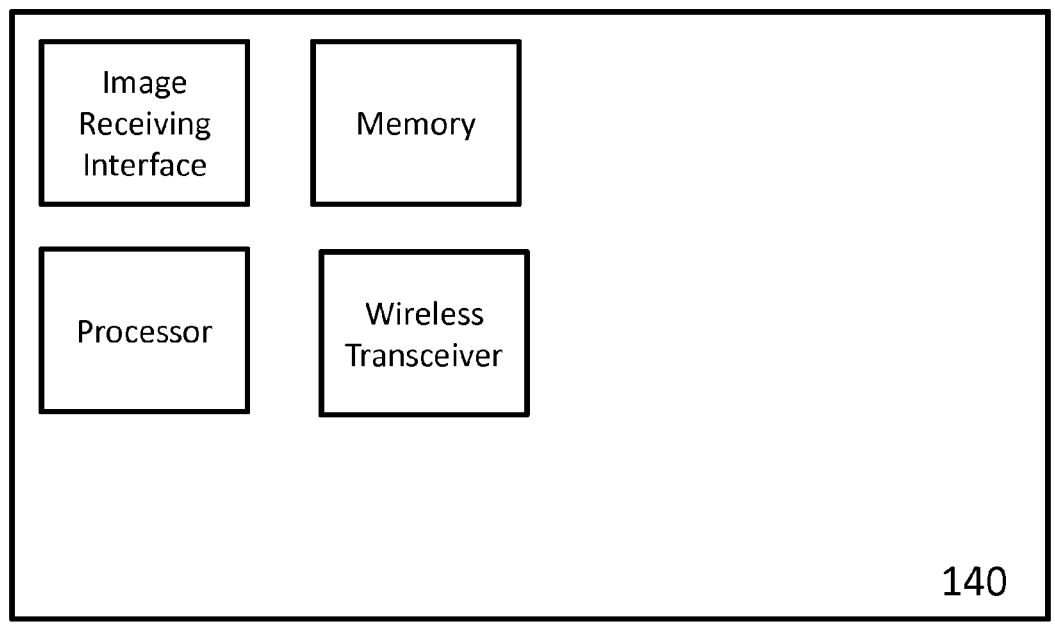
FIG. 16 is a block diagram of an image processing system for receiving and processing images using a series of cameras.

As shown in FIG. 16, the image processor 140 (as well as the image registration system 160) can be implemented as any of: (1) computer software being run on a general purpose computer and controlling a computer processor of the computer to perform the computer instructions of the computer software, where the computer instructions are stored in a computer memory of the computer, (2) hardware for performing at least one of (a) registration of cameras and mini-frames and (b) the real-time image processing as described herein, and (3) a combination of (1) and (2). With respect to (1), the computer may include a combination of volatile (e.g., RAM, SRAM) and non-volatile memory (e.g., flash memory such as NAND flash memory, and magnetic and/or optical storage devices). The computer processor may include on-board memory and/or external memory, and the processor may include any number processing cores and thread control circuitry. The processor may further include both general purpose instructions as well as circuitry for executing instructions in parallel or via a co-processor or digital signal processor (DSP). With respect to (2), the hardware can be any one or a combination of application specific integrated circuits (ASICs), programmable and/or reprogrammable logic devices (e.g., FPGAs, PALs and GALs), and custom processors (e.g., such as are built from logic "cores" that are integrated with other "glue" logic or processing circuitry (such are interface circuitry) into a larger chip). Generally, the above embodiments are referred to herein as "circuitry." Moreover, the circuitry for performing a function on a first mini-frame, frame or other portion of an image may be the same as the circuitry for performing a function on a second mini-frame, frame or other portion of an image when the same circuitry is used sequentially by the system. In an alternate embodiment, circuitry may be replicated so that separate circuitry can operate on first and second mini-frames, frames or other portions of an image in parallel.

The image processor 140 (as well as the image registration system 160) can further include a wireless transceiver for sending and receiving information. For example, the transceiver can be used to send the real-time images constructed by the system using the registration techniques described herein. The transceiver also can be used to receive the registration information relating to the registration of the cameras if the registration is performed by a system remote from the mobile platform.

While certain configurations of structures have been illustrated for the purposes of presenting the basic structures of the present invention, one of ordinary skill in the art will appreciate that other variations are possible which would still fall within the scope of the appended claims.

The invention claimed is:

1. A video registration system, comprising:
    circuitry for receiving at least first and second mini-frames from a first camera of plural fixedly interconnected cameras;
    circuitry for creating a first extended mini-frame for the first camera of the plural fixedly interconnected cameras from at least the first and second mini-frames;
    circuitry for receiving a third mini-frame from a second camera of the plural fixedly interconnected cameras; and
    circuitry for registering the first extended mini-frame and at least the third mini-frame to determine a first registration relationship between the first and second cameras.

2. The video registration system as claimed in claim 1, wherein the first and second cameras are infrared cameras.

3. The video registration system as claimed in claim 1, wherein the first, second and third mini-frames correspond to portions of a frame imaged when field steerable mirrors associated with the first and second cameras are in a corresponding first rotation position.

4. The video registration system as claimed in claim 3, further comprising circuitry for creating a second extended mini-frame for the second camera of the plural fixedly interconnected cameras from the third mini-frame and at least a fourth mini-frame from the second camera when the field steerable mirror associated with the second cameras is in the first rotation position,
    wherein the circuitry for registering the first extended mini-frame and at least the third mini-frame comprises circuitry for registering the first and second extended mini-frames to determine a first registration relationship between the first and second cameras.

5. The video registration system as claimed in claim 4, wherein the first and second cameras are infrared cameras.

6. The video registration system as claimed in claim 4, wherein the first and second cameras are electro-optical cameras.

7. The video registration system as claimed in claim 3, wherein the first rotation position corresponds to a position at which the plural cameras have the greatest overlap.

8. The video registration system as claimed in claim 3, wherein the circuitry for registering further comprises circuitry of registering the first extended mini-frame and at least a fourth mini-frame corresponding to a portion of a frame imaged when the field steerable mirror associated with the first camera is in a second rotation position to determine a second registration relationship between the first and second rotation positions.

9. The video registration system as claimed in claim 8, wherein the video processor further comprises a control information base, and wherein the video processor compares at least one feature stored in the control information base with features in at least one of the first and second real-time frames.

10. The video registration system as claimed in claim 8, wherein the video processor further comprises a feature extractor, and wherein the feature extractor stores at least one feature extracted from at least one of the first and second frames in the control information base.

11. The video registration system as claimed in claim 8, wherein the video processor further comprises a transceiver for sending at least a portion of the first and second frames to a remote receiver.

12. The video registration system as claimed in claim 1, wherein the circuitry for registering further comprises circuitry for registering the first extended mini-frame and at least a fourth mini-frame taken by a third camera of the plural fixedly interconnected cameras to determine a second registration relationship between the first and third cameras.

13. The video registration system as claimed in claim 12, wherein the first, second, third and fourth mini-frames correspond to portions of a frame imaged when field steerable mirrors associated with the first, second and third cameras are in a corresponding first rotation position.

14. The video registration system as claimed in claim 12, wherein the circuitry for registering further comprises circuitry for registering at least one of (a) third and fourth mini-frames and (b) the first extended mini-frame with a fifth mini-frame corresponding to a fourth camera of the plural fixedly interconnected cameras to determine a third registration relationship between the fourth camera and at least one of the first, second and third cameras.

15. The video registration system as claimed in claim 14, wherein the first through fifth mini-frames correspond to portions of a frame imaged when field steerable mirrors associated with the first, second, third and fourth cameras are in a corresponding first rotation position.

16. The video registration system as claimed in claim 15, wherein the circuitry for registering further comprises circuitry of registering the first extended mini-frame and at least a sixth mini-frame corresponding to a portion of a frame imaged when the field steerable mirror associated with the first camera is in a second rotation position to determine a fourth registration relationship between the first and second rotation positions.

17. The video registration system as claimed in claim 14, wherein the first and second cameras are infrared cameras.

18. The video registration system as claimed in claim 14, wherein the first and second cameras are electro-optical cameras.

19. The video registration system as claimed in claim 1, further comprising:
    a video processor including circuitry for receiving first and second real-time frames and for determining a first movement relationship for a first mini-frame from a first selected camera of the plural cameras between the first and second real-time frames, wherein the video processor further comprises circuitry for applying the same first movement relationship to corresponding first mini-frames of each of the plural cameras between the first and second real-time frames.

20. The video registration system as claimed in claim 19, wherein the video processor further comprises circuitry for determining a second movement relationship for a second mini-frame from the first selected camera of the plural cameras between the first and second real-time frames, wherein the video processor further comprises circuitry for applying the same second movement relationship to corresponding second mini-frames of each of the plural cameras between the first and second real-time frames.

21. The video registration system as claimed in claim 19, wherein the first and second cameras are infrared cameras.

22. The video registration system as claimed in claim 19, wherein the first and second cameras are electro-optical cameras.

23. The video registration system as claimed in claim 1, wherein the first and second cameras have the same magnification.

24. The video registration system as claimed in claim 1, wherein the first and second cameras are electro-optical cameras.

* * * * *